United States Patent
Neafsey et al.

(10) Patent No.: US 9,307,403 B2
(45) Date of Patent: Apr. 5, 2016

(54) SYSTEM AND METHOD FOR NFC PEER-TO-PEER AUTHENTICATION AND SECURE DATA TRANSFER

(71) Applicant: Schlage Lock Company LLC, Indianapolis, IN (US)

(72) Inventors: Jeffrey Scott Neafsey, Golden, CO (US); Michael William Malone, Boulder, CO (US); Hamid Abouhashem, Lafayette, CO (US)

(73) Assignee: Schlage Lock Company LLC, Indianapolis, IN (US)

( * ) Notice: Subject to any disclaimer, the term of this patent is extended or adjusted under 35 U.S.C. 154(b) by 0 days.

(21) Appl. No.: 14/175,549

(22) Filed: Feb. 7, 2014

(65) Prior Publication Data

US 2014/0223523 A1 Aug. 7, 2014

Related U.S. Application Data

(60) Provisional application No. 61/762,150, filed on Feb. 7, 2013.

(51) Int. Cl.
 *G06F 21/43* (2013.01)
 *H04W 12/02* (2009.01)
 *H04W 12/06* (2009.01)

(52) U.S. Cl.
 CPC .............. *H04W 12/02* (2013.01); *G06F 21/43* (2013.01); *H04W 12/06* (2013.01)

(58) Field of Classification Search
 None
 See application file for complete search history.

(56) References Cited

U.S. PATENT DOCUMENTS

| | | | |
|---|---|---|---|
| 2004/0128500 A1* | 7/2004 | Cihula | G06F 21/34 713/155 |
| 2006/0213972 A1* | 9/2006 | Kelley et al. | 235/380 |
| 2008/0065877 A1 | 3/2008 | Son et al. | |
| 2010/0266132 A1 | 10/2010 | Bablani et al. | |
| 2011/0035604 A1* | 2/2011 | Habraken | 713/193 |
| 2011/0215159 A1 | 9/2011 | Jain | |
| 2012/0011572 A1 | 1/2012 | Chew et al. | |
| 2012/0233687 A1 | 9/2012 | Metivier et al. | |
| 2012/0280783 A1 | 11/2012 | Gerhardt et al. | |
| 2012/0280790 A1 | 11/2012 | Gerhardt et al. | |
| 2012/0324242 A1 | 12/2012 | Kirsch | |
| 2013/0007849 A1 | 1/2013 | Coulter et al. | |
| 2013/0331063 A1* | 12/2013 | Cormier et al. | 455/411 |
| 2014/0298016 A1* | 10/2014 | Ekberg et al. | 713/168 |
| 2014/0357187 A1* | 12/2014 | Ehrensvard | H04L 63/0838 455/41.1 |

FOREIGN PATENT DOCUMENTS

EP 2263361 B1 11/2012

OTHER PUBLICATIONS

International Search Report and Written Opinion, May 30, 2014, pp. 1-7, International Patent Application No. PCT/US2014/015730, International Searching Authority, Virginia.

* cited by examiner

*Primary Examiner* — David Pearson

(74) *Attorney, Agent, or Firm* — Taft Stettinius & Hollister LLP

(57) ABSTRACT

A reader device may generate a first identifier. The reader device may transmit the first identifier to a mobile device. The reader device may receive encrypted data and unencrypted data from the mobile device in which the encrypted data includes a second identifier. The reader device may evaluate whether the first identifier and the second identifier correspond to one another.

15 Claims, 3 Drawing Sheets

SYSTEM AND METHOD FOR NFC PEER-TO-PEER AUTHENTICATION AND SECURE DATA TRANSFER

CROSS-REFERENCE TO RELATED APPLICATIONS

The present application claims the benefit of U.S. Provisional Patent Application No. 61/762,150, filed on Feb. 7, 2013, which is hereby incorporated by reference in its entirety.

BACKGROUND

The present invention generally relates to authentication and secure data transfer of information such as credentials. Credentials may be used in various systems and transferred between devices in various ways. Some existing systems have various shortcomings relative to certain applications. Accordingly, there remains a need for further contributions in this area of technology.

SUMMARY

One embodiment of the present invention is a unique system and method for authentication and secure data transfer. Other embodiments include apparatuses, systems, devices, hardware, methods, and combinations for authenticating and securely transferring data. Further embodiments, forms, features, aspects, benefits, and advantages of the present application shall become apparent from the description and figures provided herewith.

BRIEF DESCRIPTION OF THE FIGURES

The description herein makes reference to the accompanying figures wherein like reference numerals refer to like parts throughout the several views, and wherein.

DETAILED DESCRIPTION OF EXEMPLARY EMBODIMENTS

Figure 1:
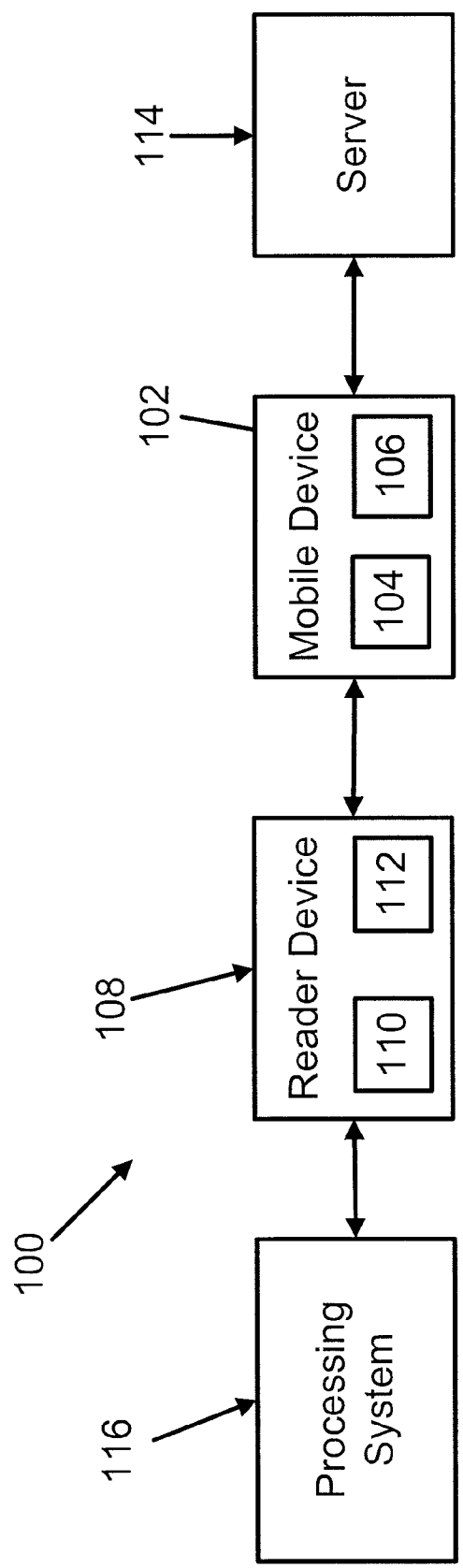
FIG. 1 is a schematic block diagram of an exemplary system.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

The present application is generally directed to a mobile device with near field communication (NFC) peer-to-peer capability for securely authenticating the mobile device with a NFC reader device. FIG. 1 illustrates a schematic block diagram of an exemplary system 100, which may be an access control system, payment system, or the like. The system 100 includes a mobile device 102 with a transceiver 104 that allows the mobile device 102 to communicate data with another device. In the embodiment shown in FIG. 1, the mobile device is a mobile phone such as a smartphone. In some embodiments, the transceiver 104 is an NFC transceiver that allows the mobile device 102 to operate in an NFC peer-to-peer mode. Furthermore, in some embodiments, the transceiver 104 is a passive device while in other embodiments the transceiver 104 is an active device. The mobile device 102 includes an application 106 that processes data related to authenticating the mobile device 102 over an NFC peer-to-peer connection. It is contemplated that the mobile device 102 may be a smartphone, contactless smartcard, or any other device that can communicate secure data.

The system 100 also includes a reader device 108. The reader device 108 may be a reader, a lock, a payment terminal, and/or any other type of device that is configured to communicate with a mobile device 102 to receive a credential or secure data for processing. In the embodiment shown in FIG. 1, the reader device 108 is an electronic lock with an NFC reader. The reader device 108 may include a transceiver 110 that allows the mobile device 102 and the reader device 108 to communicate with one another. In some embodiments, the transceiver 110 is an NFC transceiver that allows the mobile device 102 and the reader device 108 to communicate over an NFC peer-to-peer connection. NFC peer-to-peer devices, such as the mobile device 102 and the reader device 108, may push or beam various forms of clear-text data. which is not secure, between them. The reader device 108 also includes an application 112 that processes data related to authenticating the mobile device 102 over an NFC peer-to-peer connection.

The system 100 further includes a server 114 that communicates with the mobile device 102 over the Internet, cellular data network, or any combination thereof The server 114 provides the application 106 to the mobile device 102. In the embodiment shown in FIG. 1, the server 114 is a web server. It is contemplated that the server 114 may be another type of server.

The mobile device 102 is configured to send secure data to the reader device 108, which verifies the secure data. The reader device 108 is configured to send the secure data, if verified, to a processing system 116. The processing system 116 may be an access control panel, a payment processing system, or the like. For example, the processing system 116 processes the secure data to determine whether a user of the mobile device 102 should be allowed access to an area, or whether a payment has been approved.

Figure 2:
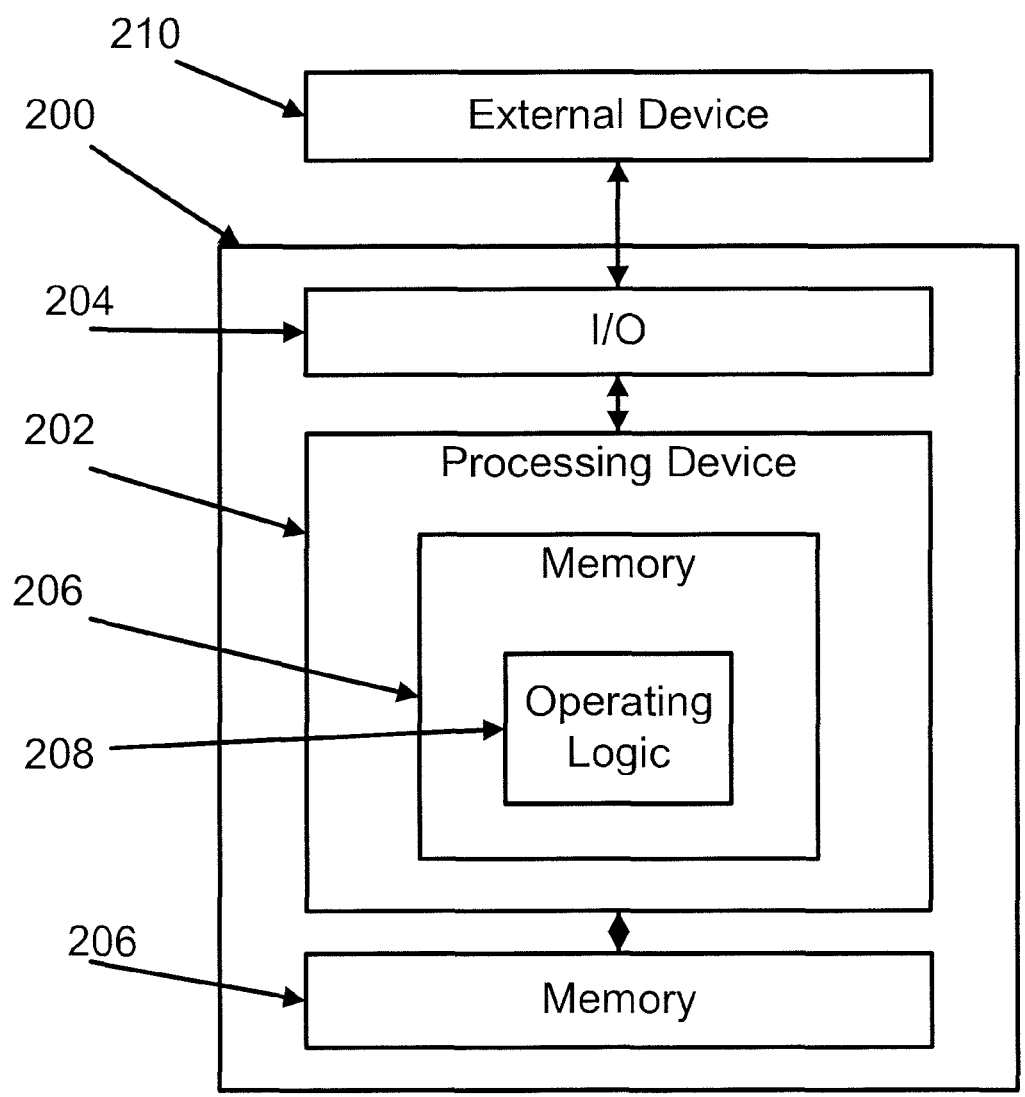
FIG. 2 is a schematic block diagram of an exemplary computing device.

FIG. 2 is a schematic block diagram of a computing device 200. The computing device 200 is one example of a mobile device, reader device, server, or processing system configuration that may be utilized in connection with the mobile device 102, reader device 108, server 114, or processing system 116 shown in FIG. 1. Computing device 200 includes a processing device 202, an input/output device 204, memory 206, and operating logic 208. Furthermore, computing device 200 communicates with one or more external devices 210.

The input/output device 204 allows the computing device 200 to communicate with the external device 210. For example, the input/output device 204 may be a transceiver, network adapter, network card, interface, or a port (e.g., a USB port, serial port, parallel port, an analog port, a digital port, VGA, DVI, HDMI, FireWire, CAT 5, or any other type of port or interface). The input/output device 204 may be comprised of hardware, software, and/or firmware. It is contemplated that the input/output device 204 will include more than one of these adapters, cards, or ports.

The external device 210 may be any type of device that allows data to be inputted or outputted from the computing device 200. For example, the external device 210 may be a mobile device, a reader device, equipment, a handheld computer, a diagnostic tool, a controller, a computer, a server, a processing system, a printer, a display, an alarm, an illuminated indicator such as a status indicator, a keyboard, a mouse, or a touch screen display. Furthermore, it is contemplated that the external device 210 may be integrated into the computing device 200. It is further contemplated that there may be more than one external device in communication with the computing device 200.

Processing device 202 can be a programmable type, a dedicated, hardwired state machine; or a combination of these; and it can further include multiple processors, Arithmetic-Logic Units (ALUs), Central Processing Units (CPUs), Digital Signal Processors (DSPs), or the like. Processing devices 202 with multiple processing units may utilize distributed, pipelined, and/or parallel processing. Processing device 202 may be dedicated to performance of just the operations described herein or may be utilized in one or more additional applications. In the depicted form, processing device 202 is of a programmable variety that executes algorithms and processes data in accordance with operating logic 208 as defined by programming instructions (such as software or firmware) stored in memory 206. Alternatively or additionally, operating logic 208 for processing device 202 is at least partially defined by hardwired logic or other hardware. Processing device 202 can be comprised of one or more components of any type suitable to process the signals received from input/output device 204 or elsewhere, and provide desired output signals. Such components may include digital circuitry, analog circuitry, or a combination of both.

Memory 206 may be of one or more types, such as a solid-state variety, electromagnetic variety, optical variety, or a combination of these forms. Furthermore, memory 206 can be volatile, nonvolatile, or a combination of these types, and some or all of memory 206 can be of a portable variety, such as a disk, tape, memory stick, cartridge, or the like. In addition, memory 206 can store data that is manipulated by the operating logic 208 of processing device 202, such as data representative of signals received from and/or sent to input/output device 204 in addition to or in lieu of storing programming instructions defining operating logic 208, just to name one example. As shown in FIG. 2, memory 206 may be included with processing device 202 and/or coupled to the processing device 202.

Figure 3:
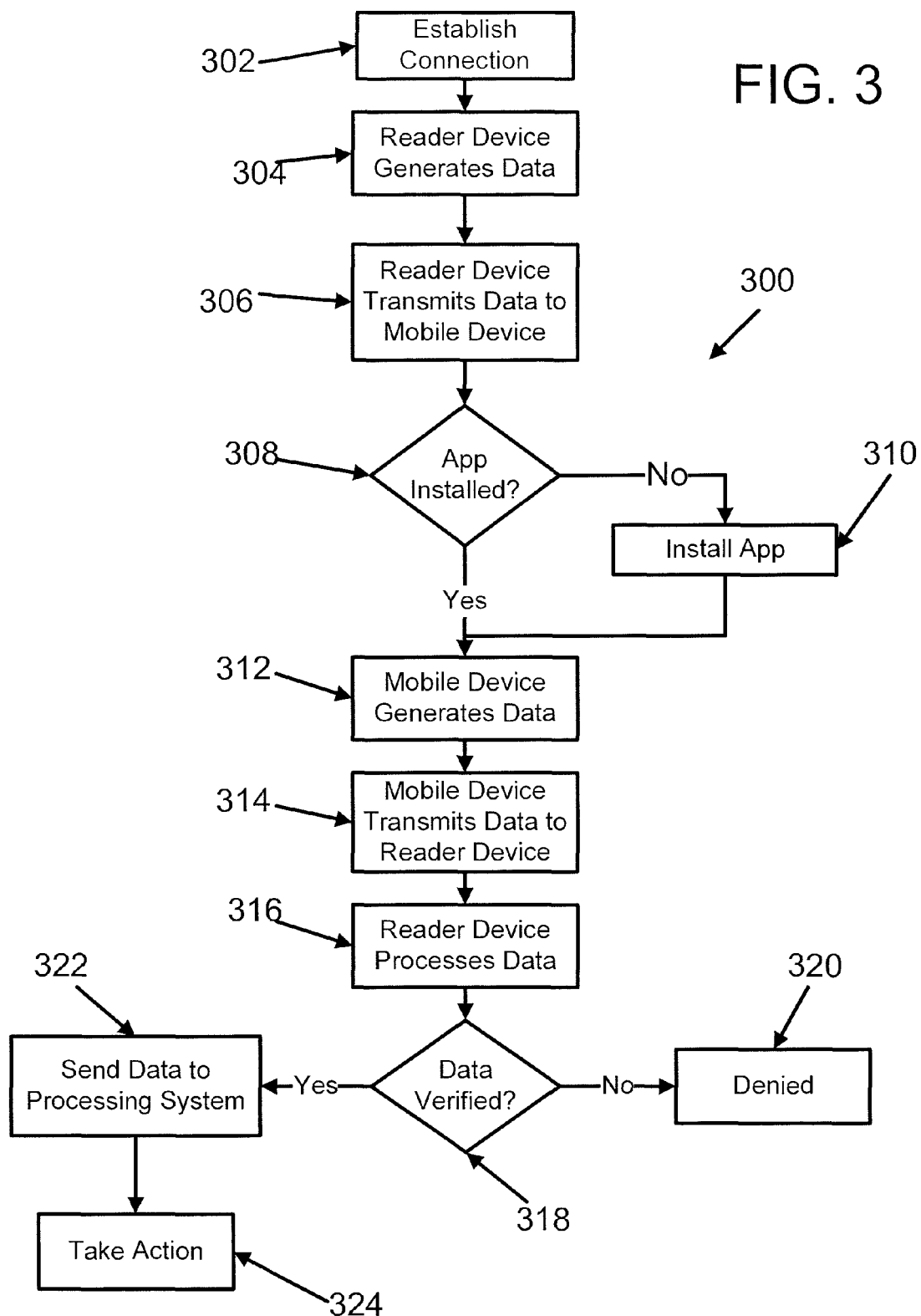
FIG. 3 is a schematic flow diagram of an exemplary process for securely authenticating a mobile device with a reader device.

FIG. 3 illustrates a schematic flow diagram of an exemplary process 300 for securely authenticating a mobile device with a reader device. Operations illustrated for all of the processes in the present application are understood to be examples only, and operations may be combined or divided, and added or removed, as well as re-ordered in whole or in part, unless explicitly stated to the contrary.

The process 300 begins at operation 302 in which the mobile device 102 and the reader device 108 establish a connection with one another. In this embodiment, the connection is an NFC peer-to-peer connection. Furthermore, it is contemplated that establishing a connection may include placing the mobile device 102 in proximity to the reader device 108.

The process 300 then proceeds to operation 304. At operation 304, the application 112 on the reader device 108 generates an identifier, such as a session identifier, and appends it to a uniform resource identifier (URI). The URI may include a uniform resource locator (URL), such as a web address, to the server 114.

The process 300 then proceeds from operation 304 to operation 306. At operation 306, the reader device 108 transmits the session identifier and the URI to the transceiver 104 of the mobile device 102 using the NFC peer-to-peer connection.

The process 300 then proceeds from operation 306 to operation 308. At operation 308, the mobile device 102 receives the session identifier and the URI, and determines whether the application 106 is installed on the mobile device 102. If the application 106 is installed on the mobile device 102, the process 300 proceeds from operation 308 to operation 312. If the application 106 is not installed on the mobile device 102, the process 300 proceeds to operation 310 where the mobile device 102 will use the URI to download and install the application 106 from the server 114. After the application 106 is installed on the mobile device 102, the process 300 proceeds to operation 312.

At operation 312, the application 106 on the mobile device 102 encrypts the session identifier, secure data, and a unique device identifier with a symmetric key or a device diversified symmetric key. The secure data may include a credential, a unique number, payment information, the facility code and badge identifier, and/or any other type of secret information that may be used in an access control system, payment system, or any other similar type of system.

The process 300 then proceeds from operation 312 to operation 314. At operation 314, the application 106 on the mobile device 102 transmits or pushes, via the transceiver 104, the encrypted payload (session identifier, secure data, unique device identifier) along with the unique device identifier (unencrypted) to the reader device 108.

The process 300 then proceeds from operation 314 to operation 316. At operation 316, the reader device 108 receives the data, via transceiver 110, from the mobile device 102. The application 112 on the reader device 108 decrypts the payload using a symmetric key or a device diversified symmetric key.

The process 300 then proceeds from operation 316 to operation 318. At operation 318, the application 112 on the reader device 108 verifies that the session identifier received from the mobile device 102 matches or corresponds to the session identifier that was sent to the mobile device 102. The application 112 also verifies that copies of the unique device identifier received from the mobile device 102 match or correspond to one another. In some embodiments, the session identifiers correspond to one another if they are identical. In some embodiments, the session identifiers may not be identical, but still correspond to one another such as being sequential numbers, are associated with one another, and the like.

If either the session identifiers or the device identifiers do not correspond to one another, the process 300 proceeds from operation 318 to operation 320 because the authentication has failed. The service being requested is effectively denied because of the failed authentication as secure data is not passed to the processing system 116. It is contemplated that an illuminated indicator, an audio sound, or a message may be presented or transmitted to notify the user of the mobile device 102 that the authentication failed.

If the session identifiers and the device identifiers do correspond to one another, the process 300 proceeds from operation 318 to operation 322. At operation 322, the reader device 108 transmits the secure data to the processing system 116. The processing system 116 processes the secure data to determine, e.g., whether the mobile device 102 may access an area or whether a payment should be allowed. The processing system 116 sends a response back to the reader device 108 indicating the action that the reader device 108 should take.

The process 300 then proceeds from operation 322 to operation 324. At operation 324, the reader device 108 takes the action indicated by the processing system 116. For example, if the reader device 108 is an electronic lock with NFC reader, the reader device 108 will open the lock. As another example, if the reader device 108 is a payment terminal, the reader device 108 will accept the payment and complete the transaction. Other types of reader devices and use cases are contemplated.

The various aspects of the process 300 in the present application may be implemented in operating logic 208 as operations by software, hardware, artificial intelligence, fuzzy logic, or any combination thereof, or at least partially performed by a user or operator. In certain embodiments, operations represent software elements as a computer program encoded on a computer readable medium, wherein the mobile device 102, reader device 108, server 114, and/or processing system 116 performs the described operations when executing the computer program.

One embodiment of the present application includes a method, comprising, generating a first identifier with a reader device; transmitting the first identifier to a mobile device; receiving, with the reader device, encrypted data and unencrypted data from the mobile device, wherein the encrypted data includes at least a second identifier; evaluating, with the reader device, whether at least a portion of the encrypted data and at least a portion of the unencrypted data correspond to one another; and evaluating, with the reader device, whether the first identifier and the second identifier correspond to one another.

Additional features of this embodiment of the present application may include: wherein the first identifier and the second identifier correspond to one another if they are identical; wherein the portion of the encrypted data and the portion of the unencrypted data is a device identifier; wherein the encrypted data includes a secure data; transmitting, with the reader device, the secured data to a processing system; wherein the processing system is one of an access control system and a payment system; and/or wherein the reader device and the mobile device communicate with one another via a NFC peer-to-peer mode.

Another embodiment of the present application includes a method, comprising, receiving, with a mobile device, a first identifier from a reader device; generating, with the mobile device, a data packet including the first identifier, secure data, and a device identifier; encrypting the data packet with the mobile device; and transmitting, with the mobile device, the encrypted data packet and the device identifier unencrypted to the reader device.

Additional features of this embodiment of the present application may include: wherein the first identifier is a session identifier; and/or wherein the reader device and the mobile device communicate with one another via an NFC peer-to-peer mode.

Another embodiment of the present application includes a system, comprising, a reader device configured to generate a first identifier; and a mobile device configured to receive the first identifier from the reader device, the mobile device is further configured to generate an encrypted data packet that includes a second identifier, secure data, and a device identifier, the mobile device is further configured to transmit the encrypted data packet and unencrypted data to the reader device, wherein the reader device is further configured to evaluate whether at least a portion of the encrypted data packet and at least a portion of the unencrypted data correspond to one another, wherein the reader device is further configured to evaluate whether the first identifier and the second identifier correspond to one another.

Additional features of this embodiment of the present application may include: a processing device configured to receive the secure data from the reader device when the portion of the encrypted data packet and the portion of the unencrypted data are the same and when the first identifier and the second identifier are the same; wherein the first identifier and the second identifier are a session identifier; and/or wherein the reader device and the mobile device communicate with one another via an NFC peer-to-peer mode.

While the invention has been described in connection with what is presently considered to be the preferred embodiment, it is to be understood that the invention is not to be limited to the disclosed embodiment(s), but on the contrary, is intended to cover various modifications and equivalent arrangements included within the spirit and scope of any appended claims, which scope is to be accorded the broadest interpretation so as to encompass all such modifications and equivalent structures as permitted under the law. Furthermore it should be understood that while the use of the word "preferable," "preferably," or "preferred" in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A method, comprising:
    generating a session identifier with a reader device;
    transmitting the session identifier to a mobile device over an NFC peer-to-peer connection, wherein the mobile device includes a unique device identity;
    receiving, with the reader device, encrypted data and unencrypted data from the mobile device over the NFC peer-to-peer connection, wherein the encrypted data is generated with a symmetric key via an application installed on the mobile device, wherein the encrypted data includes at least the session identifier and the unique device identity, and the unencrypted data includes the unique device identity;
    evaluating, with the reader device, whether the session identifier of the encrypted data corresponds to the session identifier transmitted to the mobile device and whether the unique device identity of the encrypted data corresponds to the unique device identity of the mobile device; and
    failing authentication of the mobile device with the reader device when either the session identifiers do not correspond to one another or the unique device identifiers do not correspond to one another.

2. The method of claim 1, wherein the session identifiers correspond to one another if they are identical.

3. The method of claim 1, wherein the session identifier identifies an authentication session between the mobile device and the reader device.

4. The method of claim 1, wherein the encrypted data includes a secure data.

5. The method of claim 4, further comprising:
    transmitting, with the reader device, the secure data to a processing system, wherein the processing system is one of an access control system and a payment system.

6. The method of claim 5, further comprising:
determining, with the processing system, whether to grant one of an access request and a payment request based on the secure data.

7. The method of claim 1, further comprising:
transmitting, with the reader device, a uniform resource identifier to the mobile device with the session identifier.

8. The method of claim 7, wherein the uniform resource identifier includes a uniform resource locator to a web server to download an application from the web server to the mobile device, wherein the application is configured to encrypt the session identifier and the unique device identity.

9. A method, comprising:
receiving, with a mobile device, a session identifier from a reader device over an NFC peer-to-peer connection that identifies an authentication session between the mobile device and the reader device;
generating, with the mobile device, a data packet including the session identifier, secure data, and a device identifier that is unique to the mobile device;
encrypting the data packet with a symmetric key via an application installed on the mobile device;
transmitting, with the mobile device, the encrypted data packet and an unencrypted one of the device identifier to the reader device over the NFC peer-to-peer connection; and
authenticating the mobile device with the reader device when both the session identifier in the encrypted data packet corresponds to the session identifier received by the mobile device and the device identifier in the encrypted data packet corresponds to the device identifier that is unique to the mobile device.

10. The method of claim 9, further comprising:
receiving, with the mobile device, a uniform resource identifier from the reader device.

11. The method of claim 10, further comprising:
downloading, with the mobile device, an application from a web server based on a uniform resource locator in the uniform resource identifier.

12. The method of claim 9, wherein the mobile device is a smartphone.

13. A system, comprising:
a reader device configured to generate a session identifier device that identifies an authentication session with the reader device; and
a mobile device configured to receive the session identifier from the reader device over an NFC peer-to-peer connection, the mobile device is further configured to generate an encrypted data packet with a symmetric key via an application installed on the mobile device, the encrypted data packet including the session identifier and a device identifier that is unique to the mobile device along with secure data, the mobile device is further configured to transmit the encrypted data packet and an unencrypted device identifier to the reader device over the NFC peer-to-peer connection, wherein the reader device is further configured to evaluate whether the session identifier of the encrypted data packet and the session identifier received by the mobile device correspond to one another and whether the device identifier of the encrypted data packet corresponds to the unencrypted device identifier, wherein the reader device is further configured to authenticate the mobile device with the reader device when both the session identifiers and the device identifiers correspond to one another.

14. The system of claim 13, further comprising:
a processing device configured to receive the secure data from the reader device when the mobile device is authenticated with the reader device.

15. A method, comprising:
generating a session identifier with a reader device;
transmitting the session identifier to a mobile phone over an NFC peer-to-peer connection, wherein the mobile phone includes a unique device identity;
receiving, with the reader device, encrypted data and unencrypted data from the mobile phone over the NFC peer-to-peer connection, wherein the encrypted data includes at least the session identifier and the unique device identity, and the unencrypted data includes the unique device identity;
evaluating, with the reader device, whether the session identifier of the encrypted data corresponds to the session identifier generated by the reader device and whether the unique device identity in the encrypted data corresponds to the unique device identity of the mobile phone; and
failing authentication of the mobile device with the reader device when either the session identifiers do not correspond to one another or the unique device identifiers do not correspond to one another.

* * * * *